United States Patent
Campbell et al.

(10) Patent No.: US 10,723,864 B2
(45) Date of Patent: Jul. 28, 2020

(54) FLAME RETARDANT ULTRAVIOLET LIGHT STABILIZING MOLECULES

(71) Applicant: International Business Machines Corporation, Armonk, NY (US)

(72) Inventors: Eric J. Campbell, Rochester, MN (US); Sarah K. Czaplewski-Campbell, Rochester, MN (US); Brandon M. Kobilka, Tucson, AZ (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 15/816,064

(22) Filed: Nov. 17, 2017

(65) Prior Publication Data

US 2019/0153198 A1    May 23, 2019

(51) Int. Cl.

| | | |
|---|---|---|
| *C08K 5/5399* | (2006.01) | |
| *C09K 21/12* | (2006.01) | |
| *C09K 15/30* | (2006.01) | |
| *C08K 5/3475* | (2006.01) | |
| *C08K 5/00* | (2006.01) | |

(52) U.S. Cl.
CPC .......... *C08K 5/5399* (2013.01); *C08K 5/3475* (2013.01); *C09K 15/30* (2013.01); *C09K 21/12* (2013.01); *C08K 5/0066* (2013.01)

(58) Field of Classification Search
CPC ....... C08K 5/5399; C09K 21/12; C09K 15/30
USPC .......................................................... 524/91
See application file for complete search history.

(56) References Cited

U.S. PATENT DOCUMENTS

| | | |
|---|---|---|
| 5,206,378 A | 4/1993 | MacLeay et al. |
| 6,452,018 B1 | 9/2002 | Riva et al. |
| 7,255,814 B2 | 8/2007 | Hoerold et al. |
| 9,206,204 B2 | 12/2015 | Richard et al. |
| 2001/0007885 A1* | 7/2001 | Lasch ............... C08K 5/132 524/89 |
| 2004/0138351 A1 | 7/2004 | Kaprinidis et al. |
| 2006/0135659 A1* | 6/2006 | Troutman ............ C07D 211/94 524/90 |
| 2014/0061533 A1 | 3/2014 | Schultz et al. |

FOREIGN PATENT DOCUMENTS

| | | |
|---|---|---|
| EP | 0815089 B1 | 9/2002 |
| WO | WO-2006/041221 A1 | 4/2006 |

OTHER PUBLICATIONS

Xanthopoulos, *UV Stabilizers for Engineering Plastics*, Omnexus by SpecialChenm (online), < https://omnexus.specialchem.com/selection-guide/uv-stabilizers-for-engineering-plastics/uv-stabilizers-for-polycarbonate>, The Universal Selection Source: Plastics & Elastomers, printed Aug. 3, 2017, 4 pages.

Miladinova et al., *Photo Stabilizers for Polymers—New Trends (Review)*, Journal of Chemical Technology and Metallurgy, May 2015, vol. 50, Issue 3, pp. 229-239, University of Chemical Technology and Metallurgy, Sofia, Bulgaria.

Crawford, *2(2-Hydroxyphenyl)2H-benzotriazole ultraviolet stabilizers*, Progress in Polymer Science, vol. 24, Issue 1, Elsevier Science Ltd., dated Apr. 1999, 37 pages.

* cited by examiner

*Primary Examiner* — Deve V Hall
(74) *Attorney, Agent, or Firm* — Isaac J. Gooshaw

(57) ABSTRACT

A flame retardant ultraviolet (UV) light stabilizing molecule includes a phosphorus-containing flame retardant moiety and a hydroxyphenyl-benzotriazole (HPB) moiety.

20 Claims, 16 Drawing Sheets

210

FR UV Light Stabilizer(3)

↑ mCBPA

FR UV Light Stabilizer(1)

FLAME RETARDANT ULTRAVIOLET LIGHT STABILIZING MOLECULES

BACKGROUND

Ultraviolet (UV) light stabilizers may be useful to protect adhesives, plastics, coatings, and elastomers from damaging effects of outdoor weathering that may result from exposure to UV light. For example, polycarbonate (PC) is a versatile and widely used thermoplastic polymer. However, exposure of a PC material to UV light may lead to surface degradation, which in turn affects various properties of the polymer including impact strength and clarity. Therefore, in applications with UV light exposure, a UV stabilizer may be required. Examples of UV light stabilizers include hydroxyphenyl-benzotriazole (HPB) molecules and hindered amine light stabilizer (HALS) molecules. However, HALS molecules may be inappropriate for PC materials, as these basic amine compounds may accelerate PC hydrolysis.

SUMMARY

According to an embodiment, a flame retardant ultraviolet (UV) light stabilizing molecule is disclosed. The flame retardant UV light stabilizing molecule includes a phosphorus-containing flame retardant moiety and a hydroxyphenyl-benzotriazole (HPB) moiety.

According to another embodiment, a process is disclosed that includes forming a flame retardant UV light stabilizing molecule that includes a phosphorus-containing flame retardant moiety and an HPB moiety. The process further includes utilizing the flame retardant UV light stabilizing molecule as a polymeric additive to impart flame retardant characteristics and UV light stabilization characteristics to a polymeric material.

According to yet another embodiment, an article of manufacture is disclosed that includes a polymeric material that a flame retardant UV light stabilizing molecule. The flame retardant UV light stabilizing molecule includes a phosphorus-containing flame retardant moiety and an HPB moiety.

The foregoing and other objects, features, and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

The present disclosure describes flame retardant UV light stabilizing molecules and processes for forming flame retardant UV light stabilizing molecules. The flame retardant UV light stabilizing molecules of the present disclosure include at least a hydroxyphenyl-benzotriazole (HPB) moiety and a phosphorus-containing moiety. When the flame retardant UV light stabilizing molecules are added to a polymeric material (e.g., a polycarbonate material) as an additive, the HPB moiety imparts UV light stabilization characteristics to the polymeric material to protect from surface degradation associated with exposure to UV light, and the phosphorus-containing moiety imparts flame retardancy characteristics to the polymeric material.

In some cases, the flame retardant UV light stabilizing molecules of the present disclosure may also include a matrix bonding/cross-linking (CL) functionality. The matrix bonding functionality (e.g., vinyl, amine, epoxy, allyl, or acrylate groups) may enable the molecules to be bound into an appropriate polymeric matrix material. Alternatively or additionally, in some cases, the flame retardant UV light stabilizing molecules of the present disclosure may further include a triazine moiety. The additional nitrogens of the triazine moiety may have a synergistic effect on the flame retardancy characteristics imparted by the phosphorus-containing moiety. In some cases, an aliphatic ester/amide that may be utilized as a plasticizer may be bound to the flame retardant UV light stabilizing molecules to enable the molecules to be utilized as a plasticizer.

By incorporating an HPB derivative functionality, a flame retardant functionality, and optionally other functional groups into a single molecule, the flame retardant UV light stabilizing molecules of the present disclosure may replace multiple separate additives. Replacing multiple separate additives may result in advantages associated with process simplification, cost savings (that may be associated with reduced processing time), or a combination thereof.

Figure 1A:
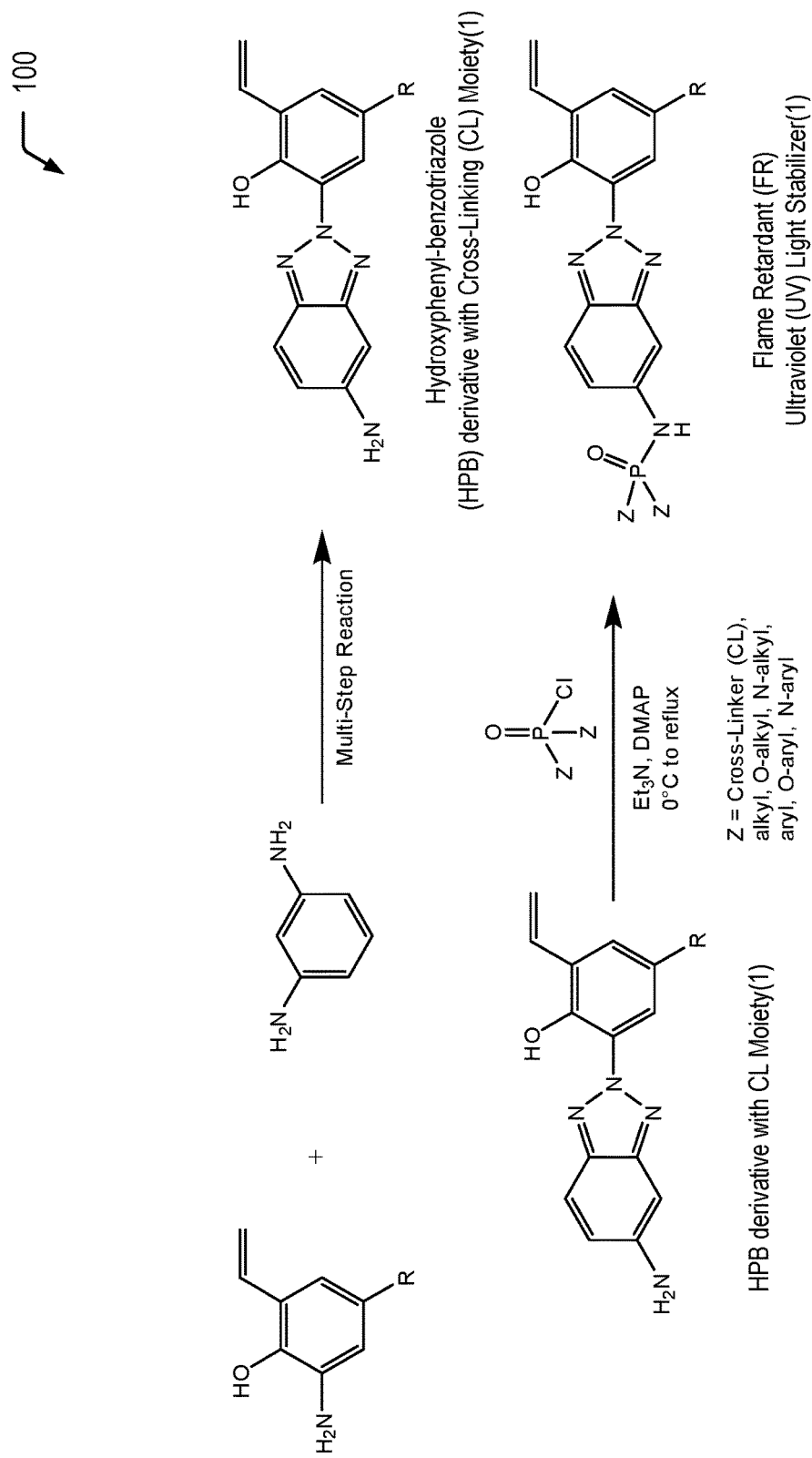
FIGS. 1A to 1C illustrate examples of alternative processes of forming a flame retardant UV light stabilizing molecule that includes a first example of a matrix bonding functionality, according to one embodiment.
Figure 1B:
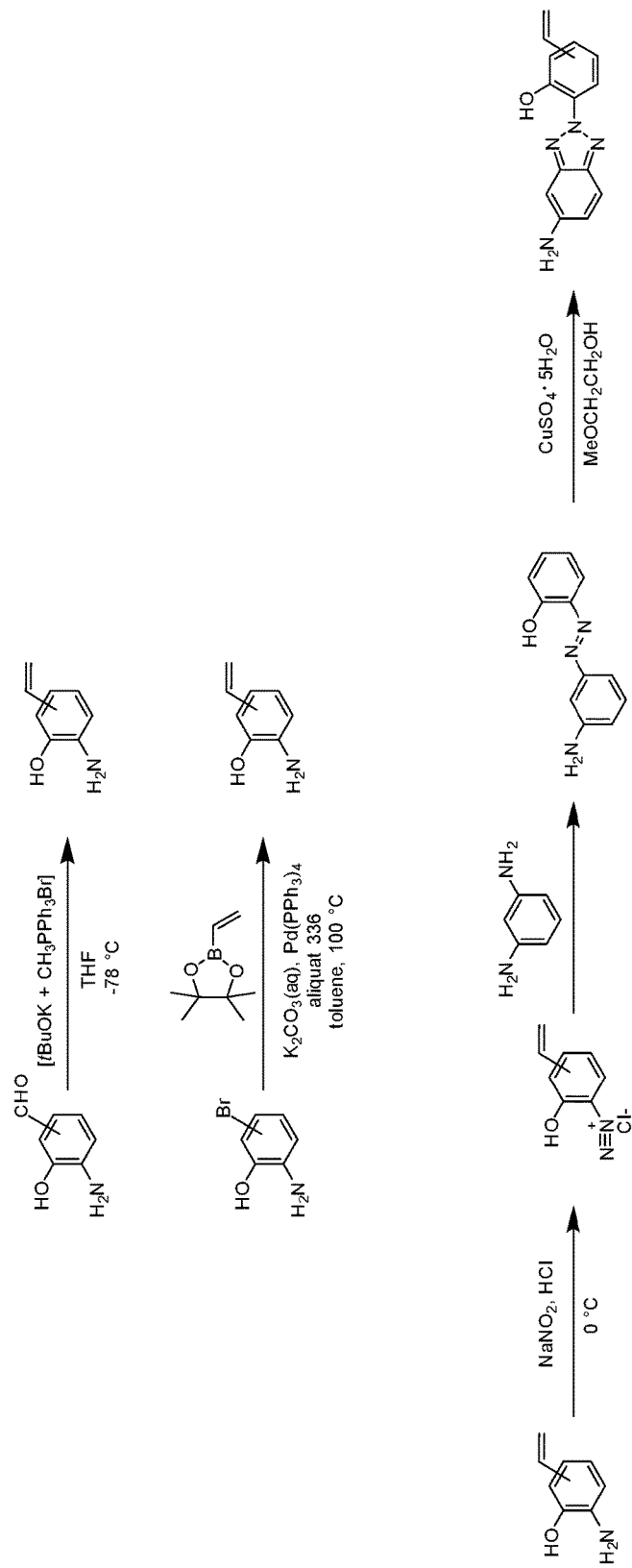
Figure 1C:
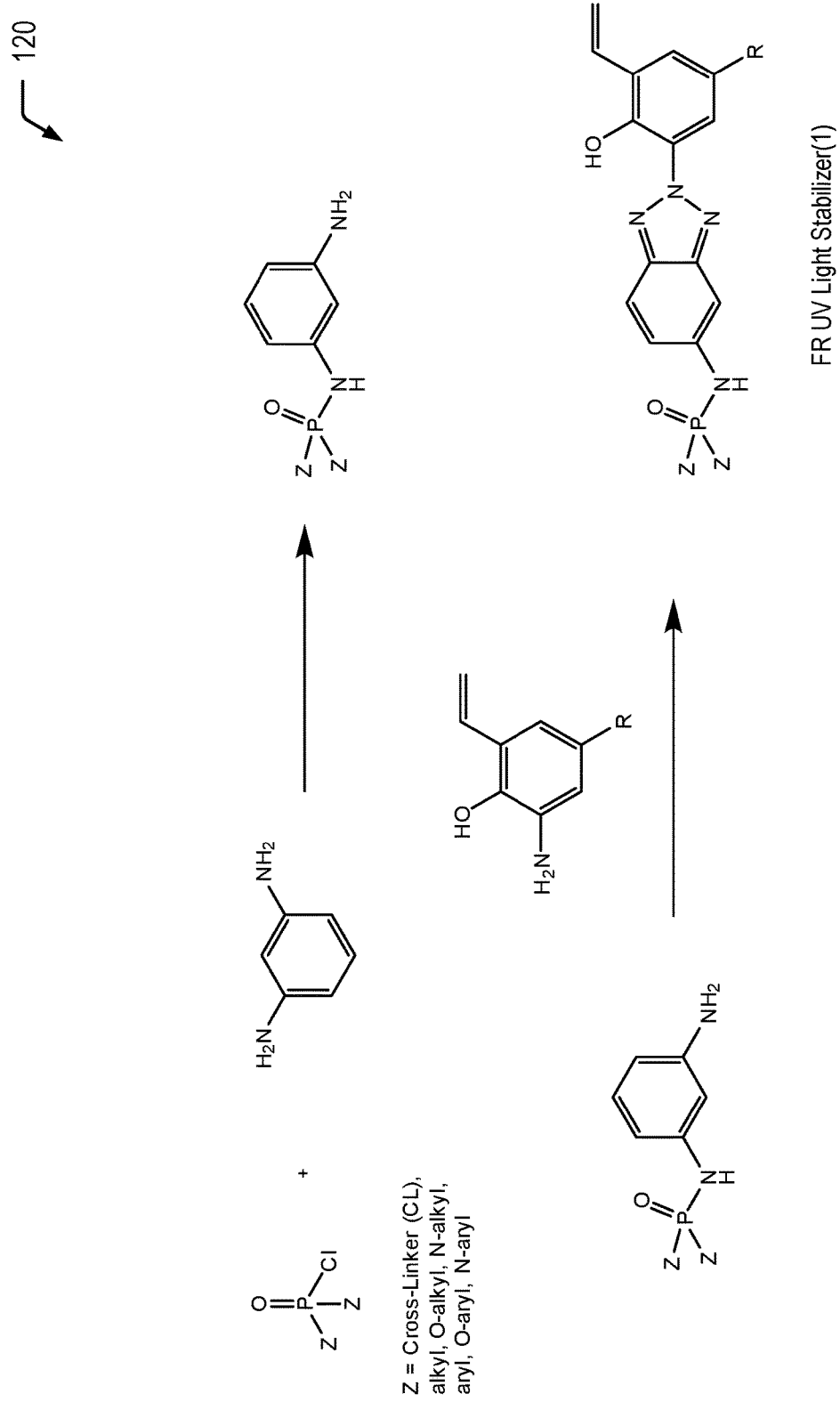

FIGS. 1A to 1C illustrate examples of alternative processes for forming a first example of a flame retardant UV light stabilizing molecule (identified as "FR UV Light Stabilizer(1)" in FIGS. 1A and 1C), according to some embodiments. The flame retardant UV light stabilizing molecule of FIGS. 1A and 1C depicts an example of a cross-linking moiety (e.g., a vinyl group). As described further herein with respect to FIGS. 2A to 2C, the cross-linking moiety of FIGS. 1A and 1C may be converted to alternative cross-linking moieties to enable the molecules to be bound into a corresponding polymeric matrix material. The first flame retardant UV light stabilizing molecule of FIGS. 1A and 1C may be utilized as an additive to impart multiple characteristics to a polymeric material via a single molecule, rather than multiple separate additives. The HPB derivative functionality may impart UV light stabilization characteristics to the polymeric material, the phosphorus-containing moiety may impart flame retardancy characteristics to the polymeric material, and the cross-linking moiety may enable the molecule to be bound into a polymeric matrix material.

Referring to FIG. 1A, a chemical reaction diagram 100 illustrates a first example of a process of forming the HPB derivative molecule that includes the phosphorus-based flame retardant moiety and the first cross-linking moiety. The first chemical reaction depicted at the top of FIG. 1A illustrates a process of forming an HPB derivative that includes a vinyl group. The second chemical reaction depicted at the bottom of FIG. 1A illustrates the subsequent addition of a phosphorus-containing moiety to the HPB derivative molecule that includes the vinyl group.

The right side of the first chemical reaction depicted in FIG. 1A illustrates the formation of an HPB derivative with a first CL moiety (identified as "HPB derivative with CL Moiety(1)" in FIG. 1A) having the following chemical structure:

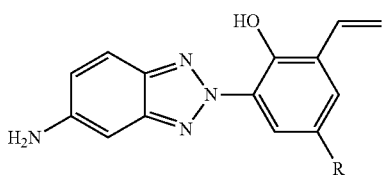

In the above chemical structure, R represents an (optional) alkyl group, such as a methyl group.

In cases where the R group is not present, the HPB derivative with the first CL moiety may have the following the following chemical structure:

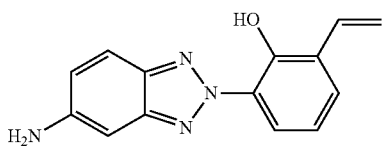 [SMILES: C=Cc1cccc(-n2nc3ccc(N)cc3n2)c1O]

The HPB derivative molecule depicted above (without the optional R group) may be formed according to the procedure depicted in FIG. 1B.

The second chemical reaction depicted at the bottom of FIG. 1A illustrates the subsequent reaction of the HPB derivative with the first CL moiety with a phosphorus-containing molecule having the following chemical structure:

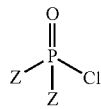

In the above chemical structure, Z represents a cross-linking group, an alkyl group, an O-alkyl group, an N-alkyl group, an aryl group, an O-aryl group, or an N-aryl group.

The right side of the second chemical reaction of FIG. 1A illustrates that the chemical reaction with the phosphorus-containing molecule results in the formation of the first flame retardant UV light stabilizing molecule having the following chemical structure:

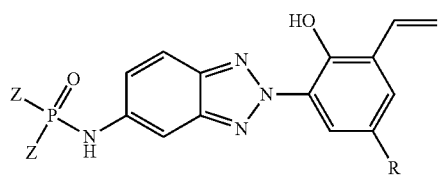

As a prophetic example, the addition reaction may include chemically reacting the HPB derivative molecule with the phosphorus-containing molecule. As a prophetic example, triethylamine (1.2 equiv.) and N,N-dimethylaminopyridine (DMAP) (3.0 mol %) may be added to a stirred solution of the HPB derivative molecule (1.0 equiv.) in 150 mL of DCM, under argon, and cooled to 0° C. A solution of the phosphorus-containing molecule in DCM (1.1 equiv.) may be added dropwise at 0° C. Upon completion of the addition, the reaction mixture may be allowed to stir for 1 hour at 0° C. and may be warmed to room temperature or reflux and stirred for 16 hours. The reaction mixture may be subsequently washed twice with water, followed by 1N HCl, three additional washes of water, and brine. The organic layer may be dried over anhydrous sodium sulfate, filtered, and the solvents removed in vacuo. The product may be purified by fractional distillation.

Referring to FIG. 1B, a chemical reaction diagram 110 illustrates a process of forming an HPB derivative molecule without the optional R group.

The first chemical reaction depicted at the top of FIG. 1B is an example of a Wittig reaction that may be performed according to the following prophetic example. To a solution of methyltriphenylphosphonium bromide (162 mmol; 58 g) in THF may be added potassium tert-butoxide (178 mmol; 21 g) in three proportions with 15-minute interval between additions. The mixture may be stirred for 1 hour at room temperature under argon. The solution may then be cooled to −78° C. Slow addition of a solution of aminohydroxybenzaldehyde (54 mmol) in THF may be made via a dropping funnel. The mixture may then be stirred for 3 hours at −78° C. and warmed to room temperature. Quenching with water, extraction with ether, washing with brine, and drying over MgSO4 may give a crude product, which may then be chromatographed.

The second chemical reaction depicted in FIG. 1B is an example of a Suzuki cross-coupling reaction that may be performed according to the following prophetic example. A mixture of vinylboronic acid bis(pinacol) ester (1.1 equiv.), aminobromophenol (1.0 equiv.), and Aliquat 336 (2% v/v) may be degassed 3 times with $N_2$ before dry toluene is added. Tetrakis(triphenylphosphine)palladium (5 mol %) and 1M aqueous sodium carbonate solution (50% v/v) which was already deaerated for 2 h may then be added under $N_2$. The mixture may be stirred vigorously and heated at reflux for 2 days. The mixture may be allowed to cool to room temperature, the organic phase may be passed through a plug of Celite to remove palladium black, and the filtrate may be concentrated to dryness in vacuo. The product may be purified by column chromatography (silica gel) with chloroform as the eluent.

The chemical reaction depicted at the bottom of FIG. 1B is an example of the synthesis of BTA that may be performed according to the following prophetic example. A solution of 0.01 mol vinyl-o-aminophenol in 15 mL of water and 2 mL of concentrated hydrochloric acid may be diazotized at 0-5° C. in the presence of 0.04 g of copper(II) sulfate pentahydrate with a solution of sodium nitrite (1 equiv.) in 5 mL of water. The cold solution (5° C.) of the diazonium chloride may be added dropwise to a solution (5° C.) of m-phenylenediamine (1.08 g, 0.01 mol) in 20 mL of water and 1 mL of concentrated hydrochloric acid over a period of 20 min. To this mixture, a solution of sodium acetate (10 mL, 40%) may be added over a period of 0.5 h with stirring at 5° C. After 2 h of stirring at room temperature, the reaction mixture may be treated with 5 mL of 25% aqueous ammonium hydroxide solution (to pH=8) and the precipitate of azo compound may be isolated by filtration and washed four times with water. Then the azo compound may be dissolved in 2-methoxyethanol (50 mL). Copper(II) sulfate pentahydrate (6.0 g) in 15 mL of water and 24 mL of 25% aqueous ammonium hydroxide solution may be added with stirring to the solution of the azo compound. After 2 h at 98° C., the reaction mixture may be cooled to room temperature. The suspension may be filtered, and the residue may be stirred with 20 mL of 5 M hydrochloric acid for 1 h. To the resulting acid mixture, 10 mL of water and 6 mL of 25% aqueous ammonium hydroxide solution may be added (to pH=8). The crude precipitated product may be isolated by filtration, washed with water and dried. Three-fold crystallization from butyl acetate may afford the substituted 5-aminobenzotriazole.

Referring to FIG. 1C, a chemical reaction diagram 120 illustrates an alternative method of forming the first flame retardant UV light stabilizer of FIG. 1A. FIG. 1C illustrates that the phosphorus-containing moiety may be added to the diamine prior to synthesizing the BTA-phenol compound.

In the first chemical reaction depicted at the top of FIG. 1C, a phosphorus-containing molecule is chemically reacted with a diamine to form an intermediate molecule. In the second chemical reaction depicted at the bottom of FIG. 1C, the intermediate molecule is chemically reacted with the HPB derivative molecule of FIG. 1A to form the first flame retardant UV light stabilizing molecule.

As a prophetic example, the phosphonyl or phorsphoryl chloride (1.0 equiv.) may be dissolved in $CH_2Cl_2$ and added dropwise (over 1 hour) via an addition-funnel to a solution of BTA compound (2.1 equiv.), pyridine (2.1 equiv.) and DMAP (5 mol %) in DMF. The resulting mixture may be stirred for 6 hours at ambient temperature. The reaction mixture may be diluted with $CH_2Cl_2$, filtered (in order to remove the pyridinium chloride), and the filtrate may be concentrated. The excess of unreacted BTA compound may be removed by sublimation in vacuo (1 mmHg, >120° C.), and the remaining residue may be purified by a combination of flash chromatography (gradient 2 to 5% MeOH in $CH_2Cl_2$) and/or recrystallization.

Thus, FIGS. 1A to 1C illustrate examples of alternative processes for forming a first example of a flame retardant UV light stabilizing molecule. The flame retardant UV light stabilizing molecule of FIGS. 1A and 1C represents an example of a single polymeric additive that may replace multiple separate additives, resulting in advantages associated with process simplification, cost savings, or a combination thereof (among other possible advantages). The HPB moiety may impart UV light stabilization characteristics to the polymeric material, the phosphorus-containing moiety may impart flame retardancy characteristics to the polymeric material, and the cross-linking moiety may enable the molecule to be bound into a corresponding polymeric matrix. Further, as the UV light stabilizing characteristics are associated with an HPB derivative functionality rather than a HALS functionality, the flame retardant UV light stabilizing molecule of FIGS. 1A and 1C may be satisfactory to prevent UV degradation in polycarbonate materials.

Figure 2A:
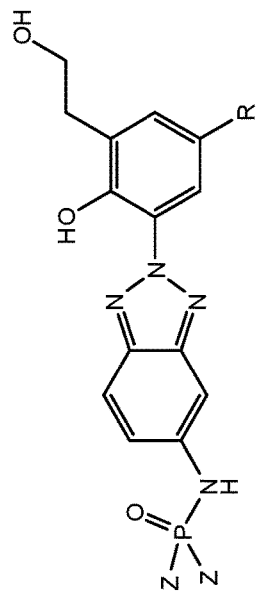
FIGS. 2A to 2C illustrate examples of processes of forming flame retardant UV light stabilizing molecules that include alternative examples of matrix bonding functionalities, according to some embodiments.
Figure 2A:
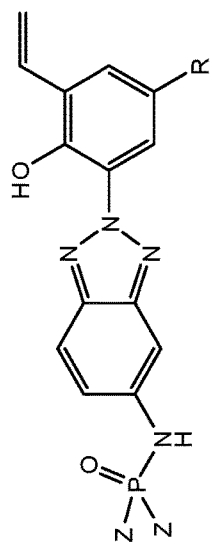
Figure 2B:
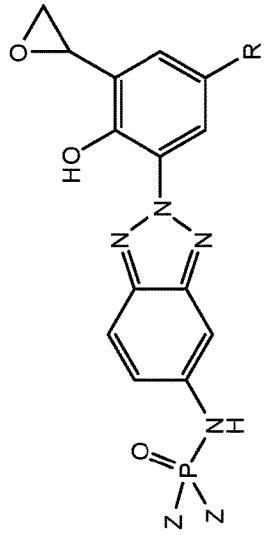
Figure 2B:
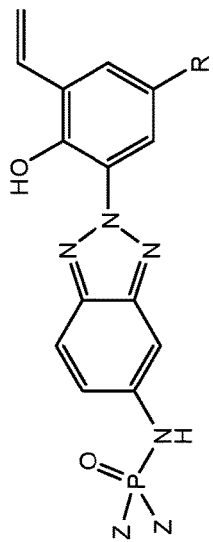
Figure 2C:
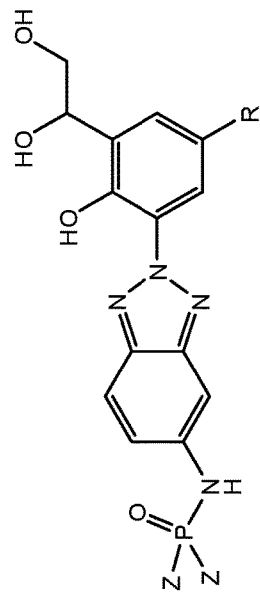
Figure 2C:
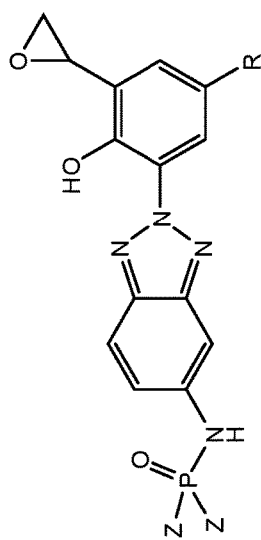

FIGS. 2A to 2C illustrate examples of processes for forming alternative examples of flame retardant UV light stabilizing molecules, according to some embodiments. The flame retardant UV light stabilizing molecules of FIGS. 2A to 2C represent examples of HPB derivative molecules that include a phosphorus-based flame retardant moiety and alternative cross-linking moieties to enable the molecule to be bound into a corresponding polymeric matrix material. The individual flame retardant UV light stabilizing molecules of FIGS. 2A to 2C may be utilized as additives to impart multiple characteristics to a polymeric material via a single molecule, rather than multiple separate additives. The HPB moiety may impart UV light stabilization characteristics to the polymeric material, the phosphorus-containing moiety may impart flame retardancy characteristics to the polymeric material, and the cross-linking moiety may enable the molecule to be bound to the polymeric material.

Referring to FIG. 2A, a chemical reaction diagram 200 illustrates an example of a process of forming a second example of a flame retardant UV light stabilizing molecule (identified as "FR UV Light Stabilizer(2)" in FIG. 2A). In FIG. 2A, the vinyl group of the flame retardant UV light stabilizing molecule of FIGS. 1A and 1B may be converted to a hydroxyl group, resulting in a flame retardant UV light stabilizing molecule having the following chemical structure:

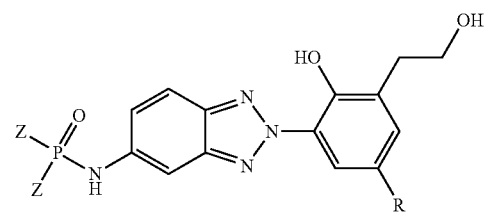

As a prophetic example, the first flame retardant UV light stabilizing molecule of FIGS. 1A and 1C may first be chemically reacted with 9-BBN in a solution of tetrahydrofuran (THF), followed by a reaction in an $H_2O_2/NaOH$ solution.

The flame retardant UV light stabilizing molecule of FIG. 2A may be utilized as an additive to impart multiple characteristics to a polymeric material via a single molecule, rather than multiple separate additives. The HPB moiety may impart UV light stabilization characteristics to the polymeric material, the phosphorus-containing moiety may impart flame retardancy characteristics to the polymeric material, and the hydroxyl group may enable the molecule to be bound into a corresponding polymeric material.

Referring to FIG. 2B, a chemical reaction diagram 210 illustrates an example of a process of forming a third example of a flame retardant UV light stabilizing molecule (identified as "FR UV Light Stabilizer(3)" in FIG. 2B). In FIG. 2B, the vinyl group of the flame retardant UV light stabilizing molecule of FIGS. 1A and 1B may be converted to an epoxide group, resulting in a flame retardant UV light stabilizing molecule having the following chemical structure:

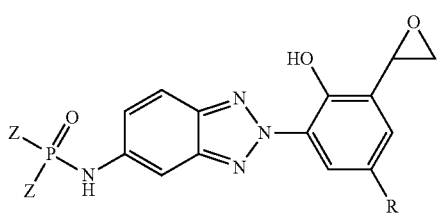

As a prophetic example, mCPBA may be utilized to convert the vinyl group of the flame retardant UV light stabilizing molecule of FIGS. 1A and 1B to an epoxide group.

The flame retardant UV light stabilizing molecule of FIG. 2B may be utilized as an additive to impart multiple characteristics to a polymeric material via a single molecule, rather than multiple separate additives. The HPB moiety may impart UV light stabilization characteristics to the polymeric material, the phosphorus-containing moiety may impart flame retardancy characteristics to the polymeric material, and the epoxide group may enable the molecule to be bound into a corresponding polymeric material.

Referring to FIG. 2C, a chemical reaction diagram 220 illustrates an example of a process of forming a fourth example of a flame retardant UV light stabilizing molecule (identified as "FR UV Light Stabilizer(4)" in FIG. 2C). In FIG. 2C, the vinyl group of the flame retardant UV light stabilizing molecule of FIGS. 1A and 1C may be converted to a diol group, resulting in a flame retardant UV light stabilizing molecule having the following chemical structure:

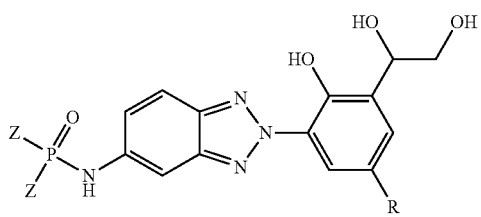

As a prophetic example, after utilizing mCPBA to convert the vinyl group to the epoxide group (as in FIG. 2B), NaOH may be utilized to form the diol group via ring-opening of the epoxide.

The flame retardant UV light stabilizing molecule of FIG. 2C may be utilized as an additive to impart multiple characteristics to a polymeric material via a single molecule, rather than multiple separate additives. The HPB moiety may impart UV light stabilization characteristics to the polymeric material, the phosphorus-containing moiety may impart flame retardancy characteristics to the polymeric material, and the diol group may enable the molecule to be bound into a corresponding polymeric material.

Thus, FIGS. 2A to 2C illustrate examples of processes for forming flame retardant UV light stabilizing molecules that include alternative cross-linking moieties. Each of the flame retardant UV light stabilizing molecules of FIGS. 2A to 2C represents an example of a single polymeric additive that may replace multiple separate additives, resulting in advantages associated with process simplification, cost savings, or a combination thereof (among other possible advantages). The HPB moiety may impart UV light stabilization characteristics to the polymeric material, the phosphorus-containing moiety may impart flame retardancy characteristics to the polymeric material, and the different cross-linking moieties may enable the molecules to be bound into alternative polymeric matrix materials. Further, as the UV light stabilizing characteristics are associated with an HPB derivative functionality rather than a HALS functionality, the flame retardant UV light stabilizing molecules of FIGS. 2A to 2C may be satisfactory to prevent UV degradation in polycarbonate materials.

Figure 3:
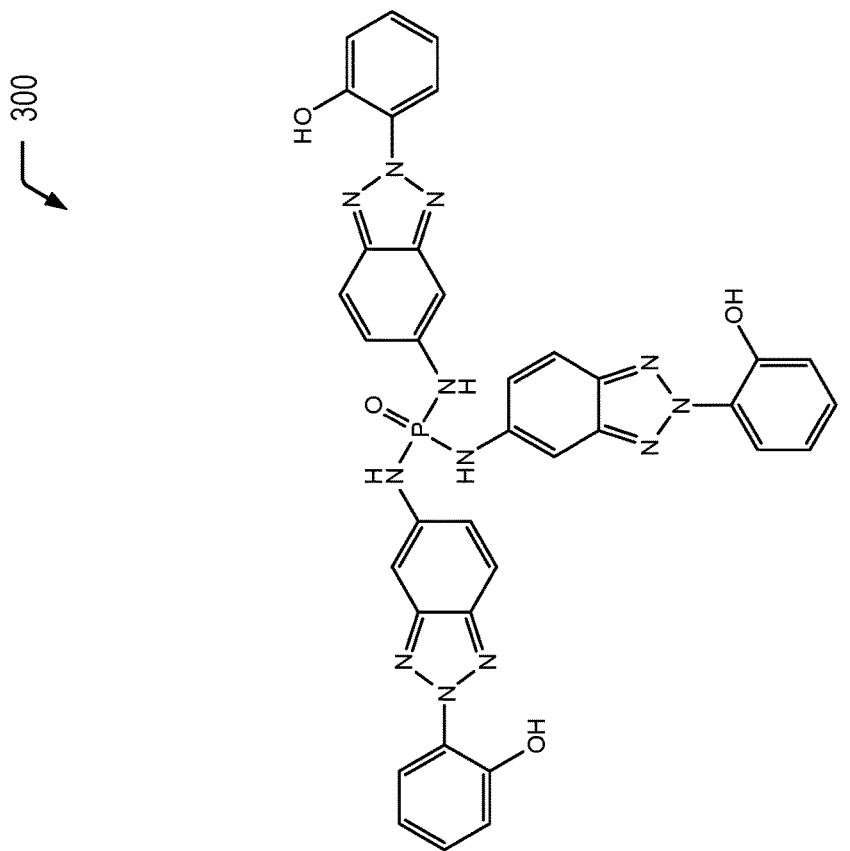
FIG. 3 illustrates an example of a process of forming a flame retardant UV light stabilizing molecule that includes multiple HPB moieties bound to a phosphorus-containing moiety, according to one embodiment.
Figure 3:
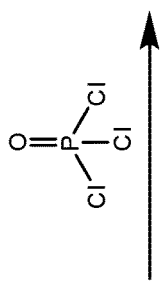
Figure 3:
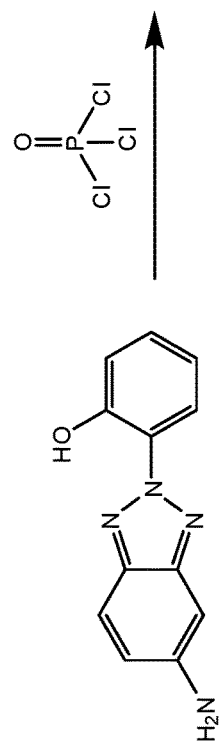

Referring to FIG. 3, a chemical reaction diagram 300 illustrates a process of forming a fifth example of a flame retardant UV light stabilizing molecule (identified as "FR UV Light Stabilizer(5)" in FIG. 3), according to one embodiment. The flame retardant UV light stabilizing molecule of FIG. 3 includes three HPB moieties bound together via a phosphorus-containing molecule.

FIG. 3 illustrates that an amino-BTA molecule may be reacted with phosphorus oxychloride to synthesize a tri-BTA phosphorus molecule. The amino-BTA molecule has the following chemical structure:

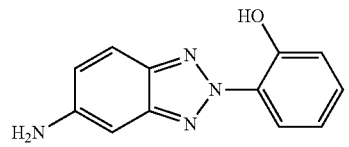 [SMILES: Nc1ccc2nn(-c3ccccc3O)nc2c1]

Thus, FIG. 3 illustrates an example of a process for forming a flame retardant UV light stabilizing molecule that includes multiple HPB moieties. The flame retardant UV light stabilizing molecule of FIG. 3 represents an example of a single polymeric additive that may replace multiple separate additives, resulting in advantages associated with process simplification, cost savings, or a combination thereof (among other possible advantages). The HPB moieties may impart UV light stabilization characteristics to the polymeric material, and the phosphorus-containing moiety may impart flame retardancy characteristics to the polymeric material. Further, as the UV light stabilizing characteristics are associated with an HPB functionality rather than a HALS functionality, the flame retardant UV light stabilizing molecule of FIG. 3 may be satisfactory to prevent UV degradation in polycarbonate materials.

Figure 4:
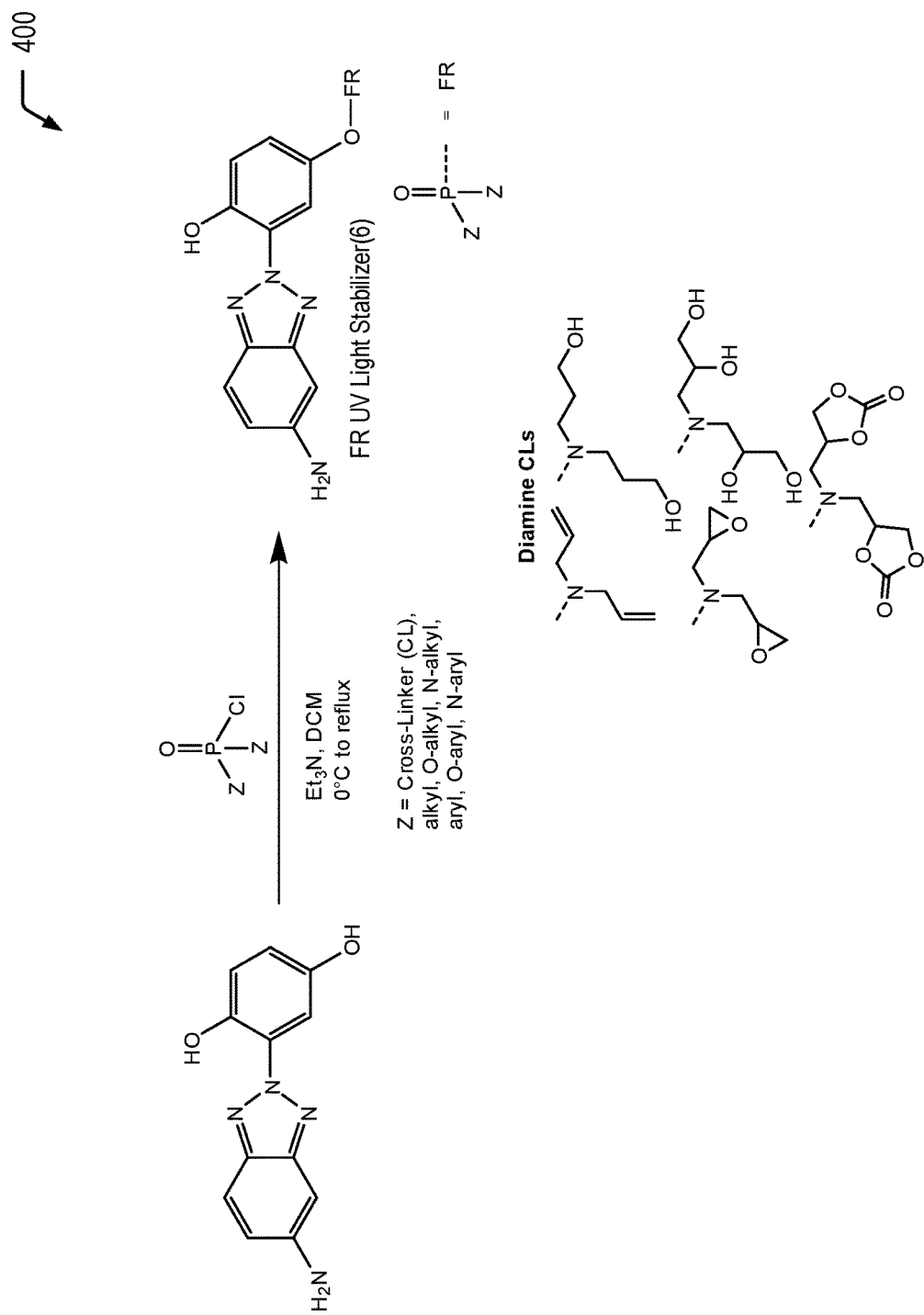
FIG. 4 illustrates an example of a process of forming a flame retardant UV light stabilizing molecule that includes phosphorus-containing flame retardant moiety and an HPB moiety, according to one embodiment.

Referring to FIG. 4, a chemical reaction diagram 400 illustrates an example of a process for forming a sixth example of a flame retardant UV light stabilizing molecule (identified as "FR UV Light Stabilizer(6)" in FIG. 4), according to one embodiment. The flame retardant UV light stabilizing molecule of FIG. 4 represents an example of an HPB derivative molecule that includes at least a phosphorus-based flame retardant moiety and optional cross-linking moieties. The flame retardant UV light stabilizing molecule of FIG. 4 may be utilized as an additive to impart multiple characteristics to a polymeric material via a single molecule, rather than multiple separate additives. The HPB moiety may impart UV light stabilization characteristics to the polymeric material, and the phosphorus-containing moiety may impart flame retardancy characteristics to the polymeric material. In cases where the flame retardant UV light stabilizing molecule includes a cross-linking moiety, the cross-linking moiety may enable the molecule to be bound into a corresponding polymeric material.

FIG. 4 illustrates that an amine-functionalized BTA bisphenol molecule may be chemically reacted with a phosphorus-containing molecule to form a variety of flame retardant UV light stabilizing molecules. While not shown in the example of FIG. 4, the amine group of the amine-functionalized BTA bisphenol molecule may be protected during this reaction using a group such as "tBoc," and deprotection may occur after functionalization with the phosphorus-containing molecule.

The right side of FIG. 4 illustrates that the resulting flame retardant UV light stabilizing molecule has the following chemical structure:

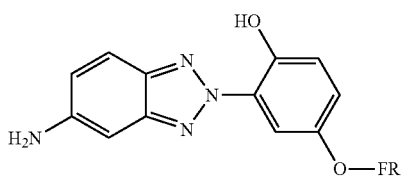

FIG. 4 further illustrates examples of diamine cross-linkers that may be bound to the phosphorus-containing molecule (where Z=CL) to enable the flame retardant UV light stabilizing molecule to be bound into a polymeric matrix material.

Thus, FIG. 4 illustrates an example of a single polymeric additive that may replace multiple separate additives, resulting in advantages associated with process simplification, cost savings, or a combination thereof (among other possible advantages). Further, as the UV light stabilizing characteristics are associated with an HPB derivative functionality rather than a HALS functionality, the flame retardant UV light stabilizing molecule of FIG. 4 may be satisfactory to prevent UV degradation in polycarbonate materials.

Figure 5A:
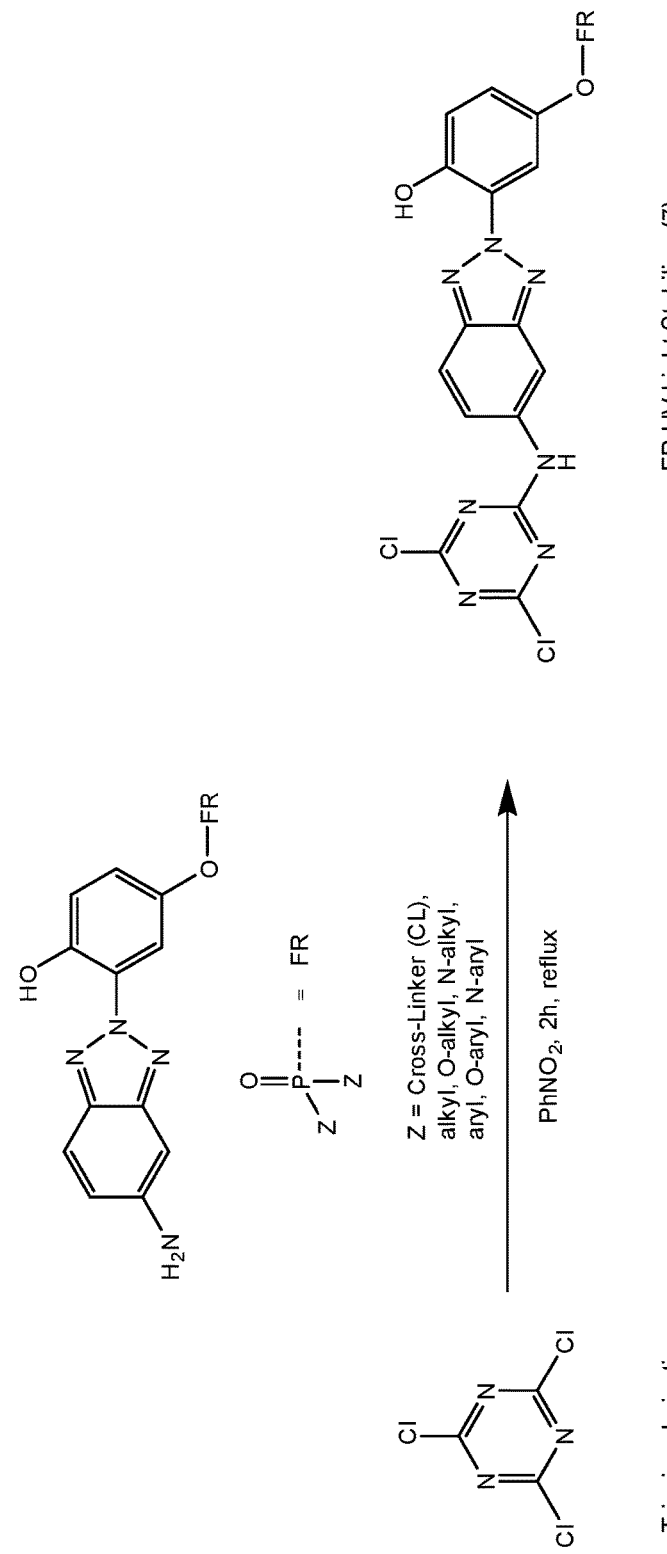
FIGS. 5A to 5C illustrate examples of processes of forming flame retardant UV light stabilizing molecules that include one or more flame retardant functionalized HPB moieties bound to a triazine moiety, according to some embodiments.
Figure 5B:
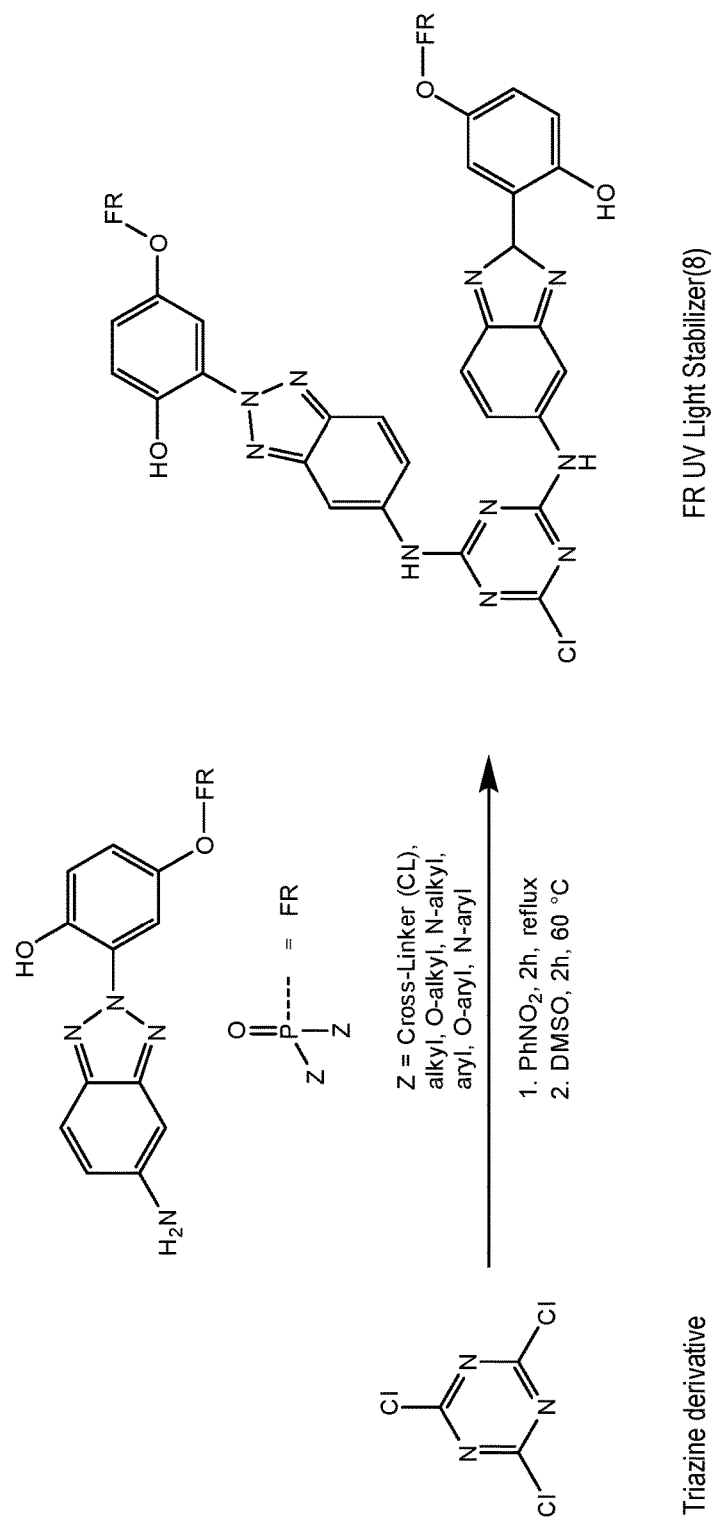
Figure 5C:
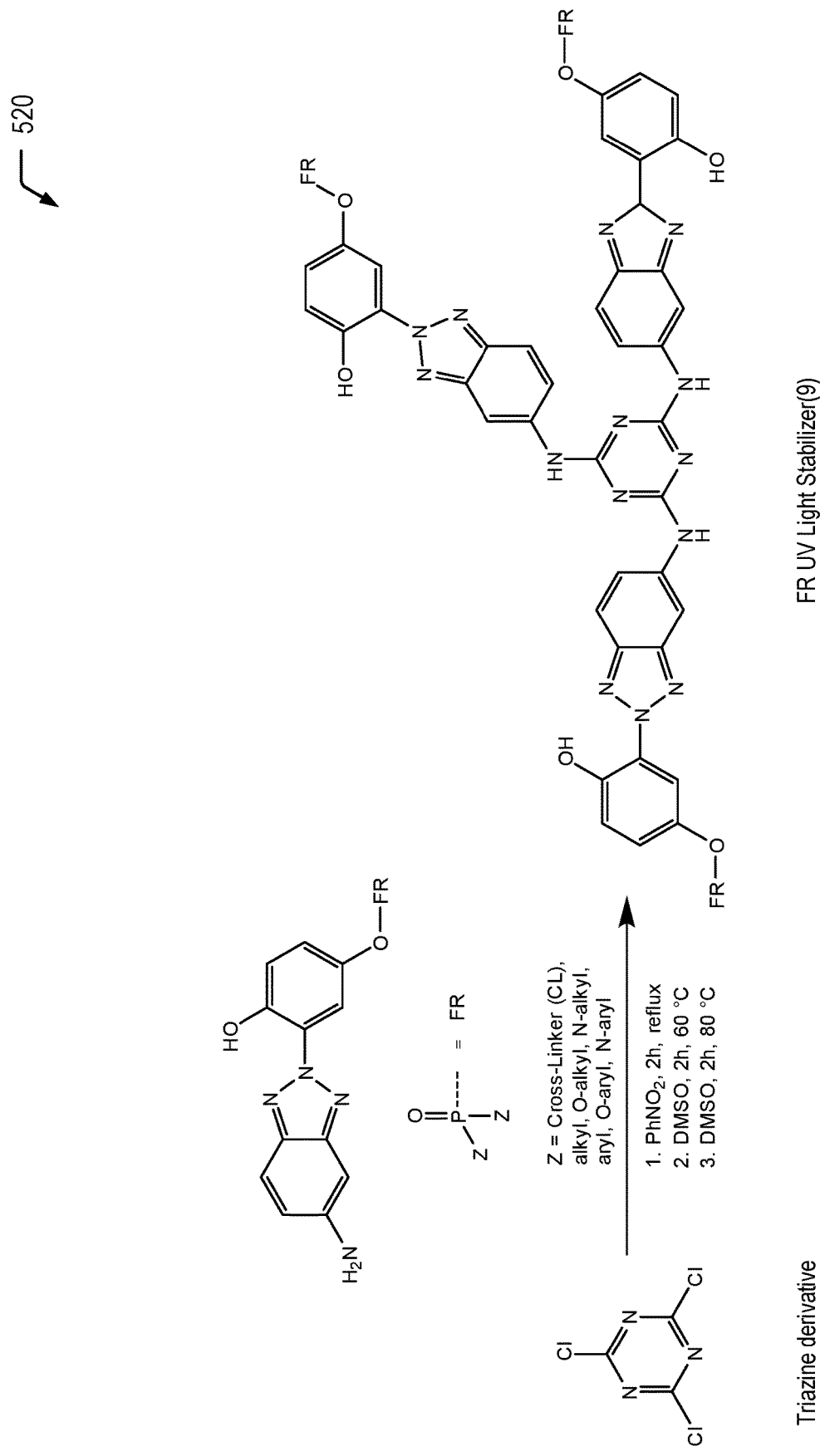

FIGS. 5A to 5C illustrate examples of processes for forming flame retardant UV light stabilizing molecules that include triazine moiety, according to some embodiments. FIG. 5A illustrates an example of a mono-functionalized triazine derivative (identified as "FR UV Light Stabilizer (7)"), FIG. 5B illustrates an example of a di-functionalized triazine derivative (identified as "FR UV Light Stabilizer(8)"), and FIG. 5C illustrates an example of a tri-functionalized triazine derivative (identified as "FR UV Light Stabilizer(9)"). The individual flame retardant UV light stabilizing molecules of FIGS. 5A to 5C may be utilized as additives to impart multiple characteristics to a polymeric material via a single molecule, rather than multiple separate additives. The HPB moiety (or multiple moieties) may impart UV light stabilization characteristics to the polymeric material, the phosphorus-containing moiety may impart flame retardancy characteristics to the polymeric material, and the additional nitrogens of the triazine moiety may provide synergistic effects on flame retardancy. Further, in some cases, the flame retardant UV light stabilizing molecules of FIGS. 5A to 5C may further include a cross-linking moiety to enable the molecule to be bound into a corresponding polymeric matrix material.

Referring to FIG. 5A, a chemical reaction diagram 500 illustrates a process of forming a mono-functionalized triazine derivative. In FIG. 5A, mono-functionalization includes a chemical reaction of a triazine derivative molecule with an HPB derivative that includes a phosphorus-containing flame retardant moiety (corresponding to the flame retardant UV light stabilizing molecule of FIG. 4).

As a prophetic example, the mono-functionalized triazine molecule may be formed via a chemical reaction of the triazine derivative depicted on the left side of FIG. 5A with the phosphorus-functionalized HPB derivative in the presence of $PhNO_2$ for 2 hours followed by reflux.

Referring to FIG. 5B, a chemical reaction diagram 510 illustrates a process of forming a di-functionalized triazine derivative. In FIG. 5B, di-functionalization includes a chemical reaction of a triazine derivative molecule with an HPB derivative that includes a phosphorus-containing flame retardant moiety (corresponding to the flame retardant UV light stabilizing molecule of FIG. 4).

As a prophetic example, the di-functionalized triazine derivative may be formed via a chemical reaction of the triazine derivative depicted on the left side of FIG. 5B with the phosphorus-functionalized HPB derivative in the presence of $PhNO_2$ for 2 hours followed by reflux, then DMSO for 2 hours at 60° C.

Referring to FIG. 5C, a chemical reaction diagram 520 illustrates a process of forming a tri-functionalized triazine derivative. In FIG. 5C, tri-functionalization includes a chemical reaction of a triazine derivative molecule with an HPB derivative that includes a phosphorus-containing flame retardant moiety (corresponding to the flame retardant UV light stabilizing molecule of FIG. 4).

As a prophetic example, the tri-functionalized triazine molecule may be formed via a chemical reaction of the triazine derivative depicted on the left side of FIG. 5C with the phosphorus-functionalized HPB derivative in the presence of $PhNO_2$ for 2 hours followed by reflux, then DMSO for 2 hours at 60° C., then DMSO for 2 hours at 80° C.

Thus, FIGS. 5A to 5C depict examples of processes of forming flame retardant UV light stabilizing molecules that include a triazine moiety. The additional nitrogens of the triazine moiety may provide synergistic effects on the flame retardancy characteristics imparted by the phosphorus-containing moiety. Each of the flame retardant UV light stabilizing molecules of FIGS. 5A to 5C represents an example of a single polymeric additive that may replace multiple separate additives, resulting in advantages associated with process simplification, cost savings, or a combination thereof (among other possible advantages). Further, as the UV light stabilizing characteristics are associated with an HPB derivative functionality rather than a HALS functionality, the flame retardant UV light stabilizing molecules of FIGS. 5A to 5C may be satisfactory to prevent UV degradation in polycarbonate materials.

FIGS. 6 to 9 illustrate examples of flame retardant UV light stabilizing molecules that include aliphatic ester/amide bridging groups, according to some embodiments. The aliphatic esters/amides may be utilized as plasticizers and may be combined with UV stabilizers to yield small molecules with multiple functionalities. These molecules may be synthesized by reacting the desired BTA or triazine with the appropriate aliphatic acid/acid chloride/amide/ester using common nucleophilic acyl substitution techniques.

Figure 6:
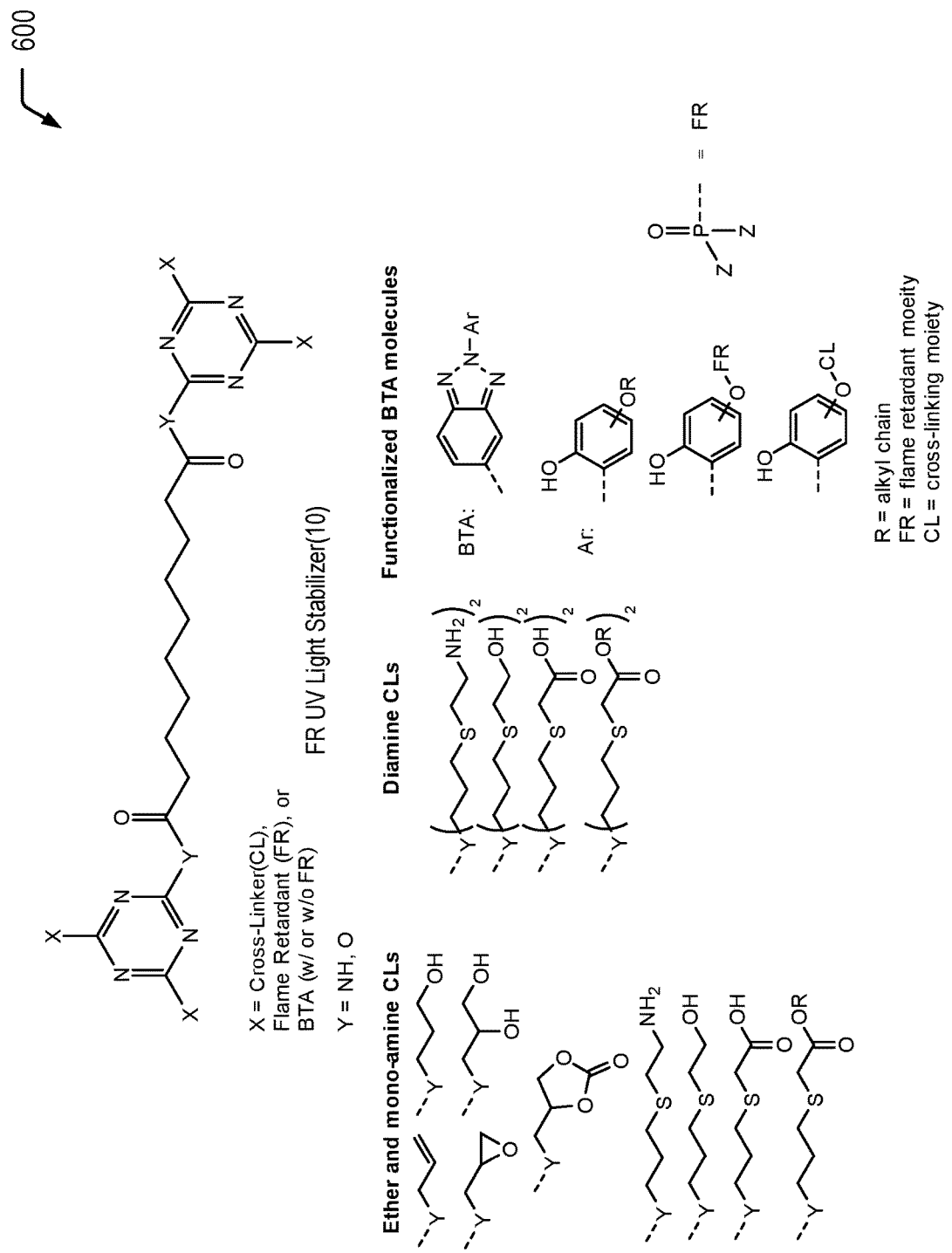
FIGS. 6 to 9 illustrate examples of processes for forming flame retardant UV light stabilizing molecules that include aliphatic ester/amide bridging groups, according to one embodiment.

Referring to FIG. 6, a chemical reaction diagram 600 illustrates an example of a process for forming an example of a BTA-functionalized triazine with aliphatic ester/amide bridging groups (ester when Y=O; amide when Y=NH), with two triazine groups per molecule. The resulting flame retardant UV light stabilizing molecule (identified as "FR UV Light Stabilizer(10)" in FIG. 6) has the following chemical structure:

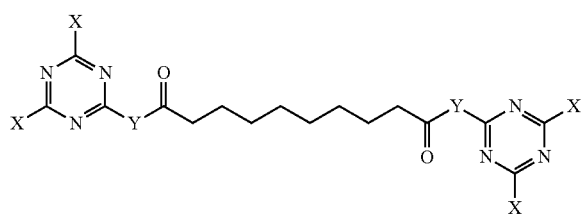

FIG. 6 further illustrates examples of ether/mono-amine cross-linkers and diamine cross-linkers that may be bound to flame retardant UV light stabilizing molecule (where Z=CL) to enable the flame retardant UV light stabilizing molecule to be bound into a polymeric matrix material. The flame retardant UV light stabilizing molecule depicted in FIG. 6 may be synthesized by reacting a flame retardant functionalized BTA-triazine molecule with the appropriate aliphatic acid/acid chloride/amide/ester using common nucleophilic acyl substitution techniques.

Figure 7:
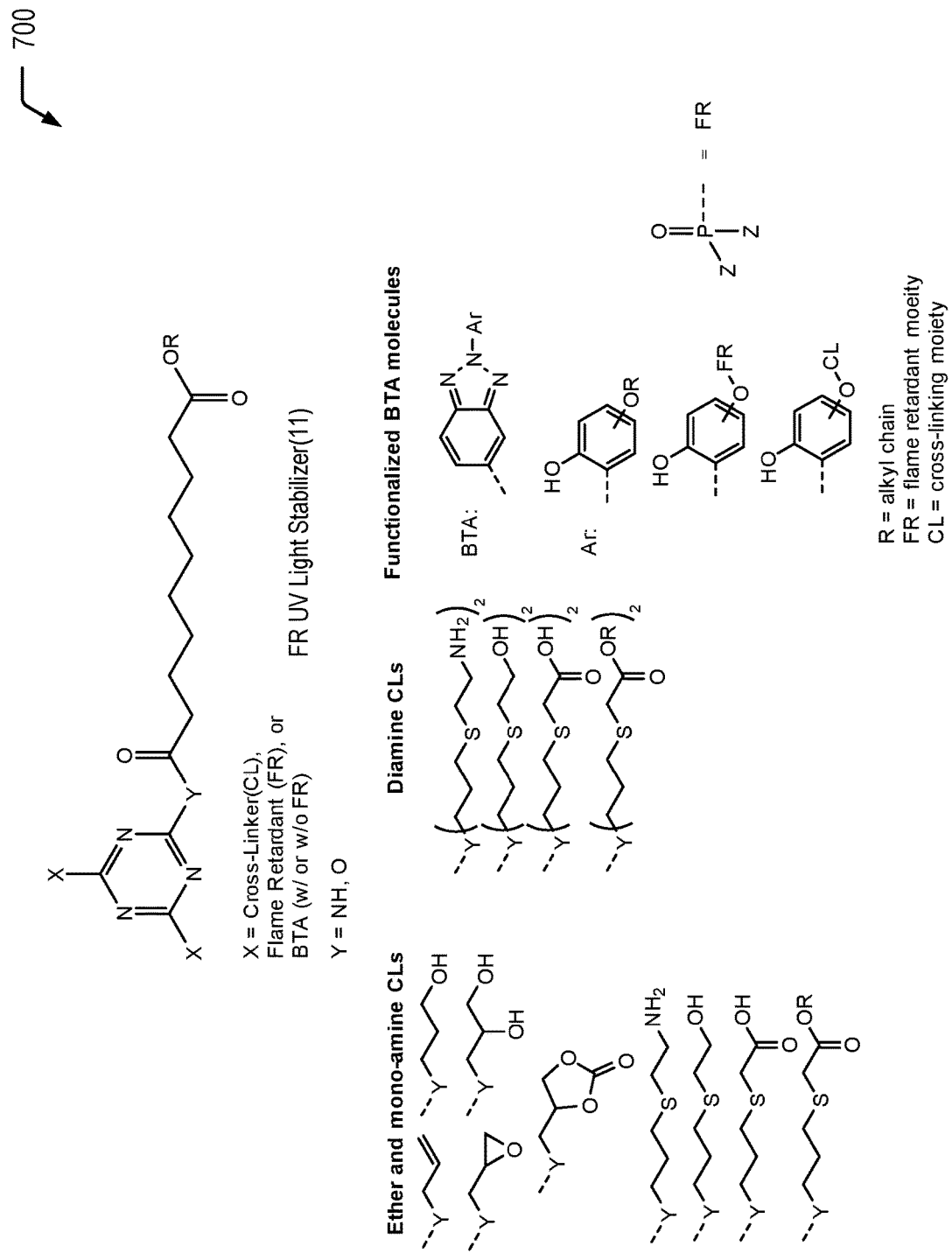

Referring to FIG. 7, a chemical reaction diagram 700 illustrates an example of a process for forming an example of a BTA-functionalized triazine with an aliphatic ester/amide bridging group (ester when Y=O; amide when Y=NH), with one triazine group per molecule. The resulting flame retardant UV light stabilizing molecule (identified as "FR UV Light Stabilizer(11)" in FIG. 7) has the following chemical structure:

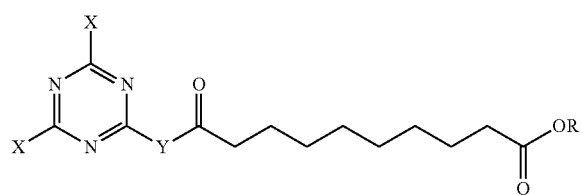

FIG. 7 further illustrates examples of ether/mono-amine cross-linkers and diamine cross-linkers that may be bound to flame retardant UV light stabilizing molecule (where Z=CL) to enable the flame retardant UV light stabilizing molecule to be bound into a polymeric matrix material. The flame retardant UV light stabilizing molecule depicted in FIG. 7 may be synthesized by reacting a flame retardant functionalized BTA-triazine molecule with the appropriate aliphatic molecule using common nucleophilic acyl substitution techniques.

Thus, FIGS. 6 and 7 depict examples of processes of forming flame retardant UV light stabilizing molecules that include triazine group(s) and aliphatic ester/amide linkages. The additional nitrogens of the triazine(s) may provide synergistic effects on flame retardancy. Further, the aliphatic esters/amides represent examples of plasticizers that would typically represent separate polymeric additives. Binding the plasticizers to the flame retardant UV light stabilizing molecules enables further reduction in the number of polymeric additives. Each of the flame retardant UV light stabilizing molecules of FIGS. 6 and 7 represents an example of a single polymeric additive that may replace multiple separate additives, resulting in advantages associated with process simplification, cost savings, or a combination thereof (among other possible advantages). Further, as the UV light stabilizing characteristics are associated with an HPB derivative functionality rather than a HALS functionality, the flame retardant UV light stabilizing molecules of FIGS. 6 and 7 may be satisfactory to prevent UV degradation in polycarbonate materials.

Figure 8:
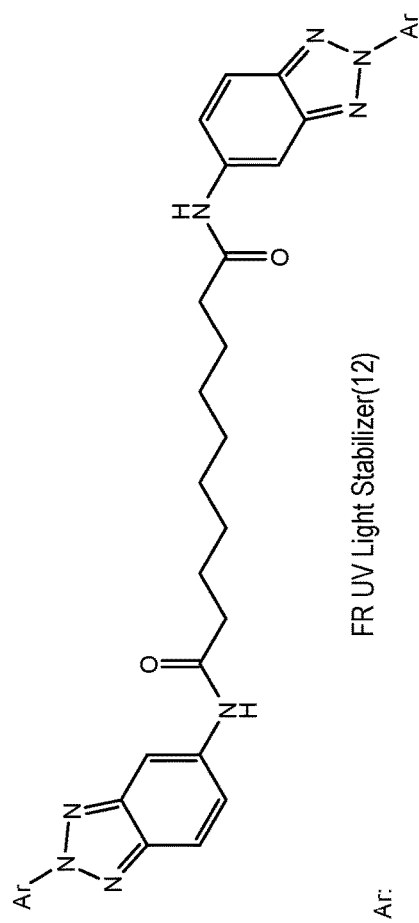
Figure 8:
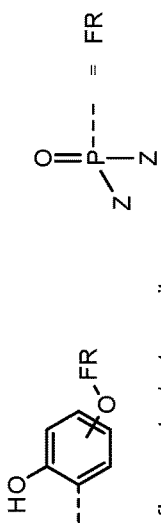

Referring to FIG. 8, a chemical reaction diagram 800 illustrates an example of a process for forming an example of a flame retardant UV light stabilizing molecule with aliphatic amide bridging groups, with two flame retardant functionalized BTA groups per molecule. The resulting flame retardant UV light stabilizing molecule (identified as "FR UV Light Stabilizer(12)" in FIG. 8) has the following chemical structure:

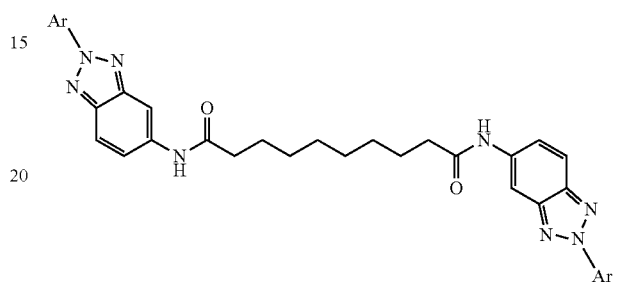

In the chemical structure depicted above, Ar represents a BTA group that includes a phosphorus moiety to impart flame retardancy characteristics. The flame retardant UV light stabilizing molecule depicted in FIG. 8 may be synthesized by reacting a flame retardant functionalized BTA molecule with the appropriate aliphatic molecule using common nucleophilic acyl substitution techniques.

Figure 9:
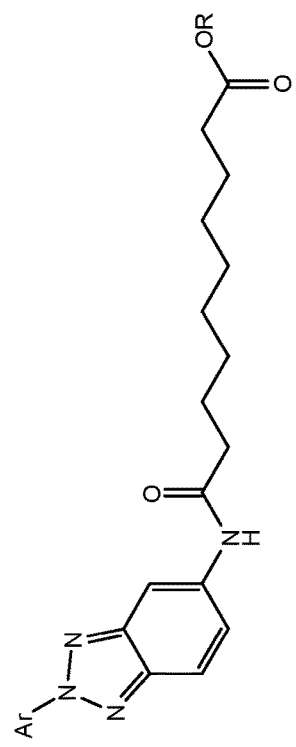
Figure 9:
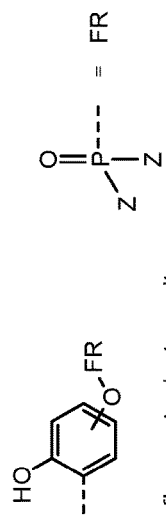

Referring to FIG. 9, a chemical reaction diagram 900 illustrates an example of a process for forming an example of a flame retardant UV light stabilizing molecule with an aliphatic amide bridging group, with one flame retardant functionalized BTA group per molecule. The resulting flame retardant UV light stabilizing molecule (identified as "FR UV Light Stabilizer(13)" in FIG. 9) has the following chemical structure:

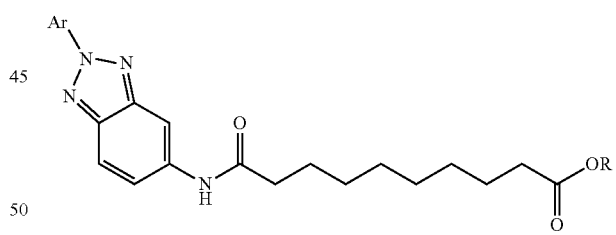

In the chemical structure depicted above, Ar represents a BTA group that includes a phosphorus moiety to impart flame retardancy characteristics. The flame retardant UV light stabilizing molecule depicted in FIG. 9 may be synthesized by reacting a flame retardant functionalized BTA molecule with the appropriate aliphatic molecule using common nucleophilic acyl substitution techniques.

Thus, FIGS. 8 and 9 depict examples of processes of forming flame retardant UV light stabilizing molecules that include aliphatic amide linkages. Aliphatic esters/amides represent examples of plasticizers that would typically represent separate polymeric additives. Binding the plasticizers to the flame retardant UV light stabilizing molecules enables further reduction in the number of polymeric additives. Each of the flame retardant UV light stabilizing molecules of FIGS. 8 and 9 represents an example of a single polymeric additive that may replace multiple separate additives, resulting in advantages associated with process simplification, cost savings, or a combination thereof (among other possible advantages). Further, as the UV light stabilizing characteristics are associated with an HPB derivative functionality rather than a HALS functionality, the flame retardant UV light stabilizing molecules of FIGS. 8 and 9 may be satisfactory to prevent UV degradation in polycarbonate materials.

Figure 10:
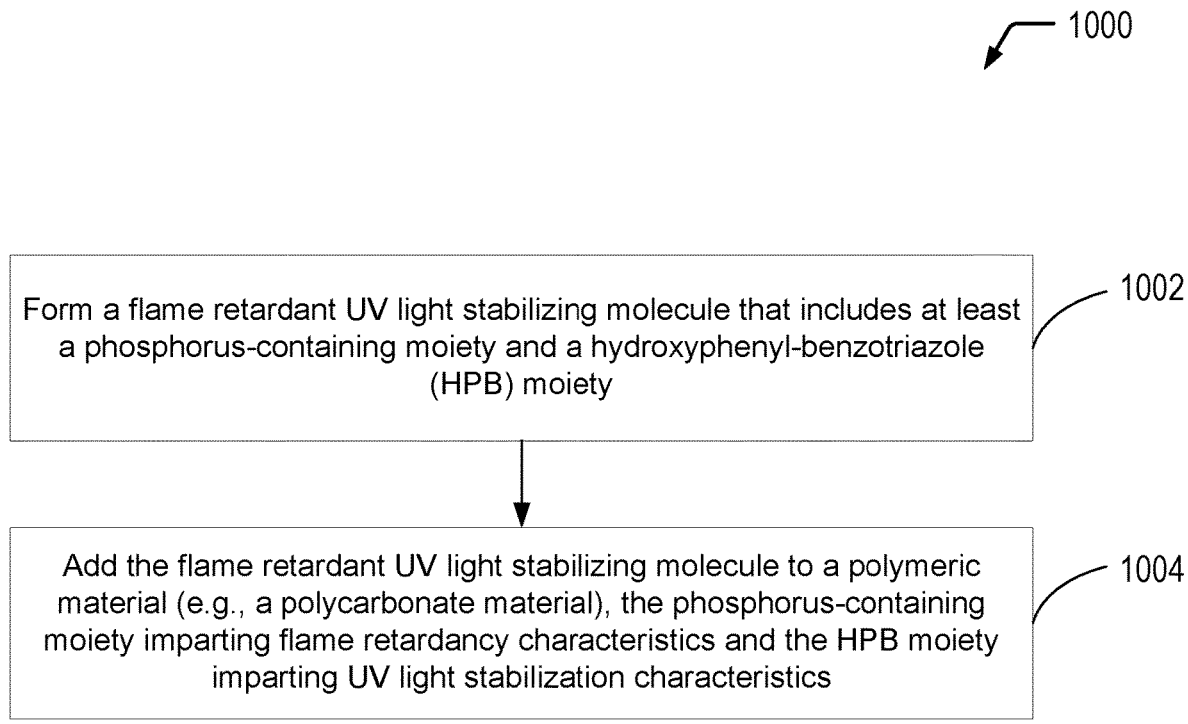
FIG. 10 is a flow diagram illustrating an example of a process of forming a flame retardant UV light stabilizing molecule to be utilized as a polymeric additive, according to one embodiment.

Referring to FIG. 10, a flow diagram illustrates a particular embodiment of a process 1000 of forming a flame retardant UV light stabilizer. In the particular embodiment depicted in FIG. 10, the process 1000 further includes utilizing the flame retardant UV light stabilizer as a polymeric additive. It will be appreciated that the operations shown in FIG. 10 are for illustrative purposes only and that the operations may be performed in alternative orders, at alternative times, by a single entity or by multiple entities, or a combination thereof. As an example, one entity may produce the flame retardant UV light stabilizing molecule (depicted as operation 1002), while the same entity or a different entity may utilize the flame retardant UV light stabilizing molecule as a polymeric additive (depicted as operation 1004). As described further herein, in some cases, the flame retardant UV light stabilizing molecule may further include additional functional groups, such as a matrix bonding functionality, a triazine moiety, an aliphatic ester/amide linkage, or various combinations thereof.

The process 1000 includes forming a flame retardant UV light stabilizing molecule, at 1002. The flame retardant UV light stabilizing molecule includes at least a phosphorus-containing moiety and a HPB moiety. For example, the flame retardant UV light stabilizer may correspond to one of the flame retardant UV light stabilizing molecules described herein with respect to FIGS. 1A-1C, 2A-2C, 3, 4, 5A-5C, and 6-9. In some cases, the flame retardant UV light stabilizing molecule may further includes additional functional group(s). As an example, the additional functional group(s) may correspond to cross-linking moieties to enable the molecule to be bound into an appropriate polymeric matrix material. As another example, the additional functional group(s) may correspond to triazine groups, with the additional nitrogens of the triazine groups enhancing the flame retardancy characteristics imparted by the phosphorus-containing moiety. As a further example, the additional functional group(s) may correspond to aliphatic esters/amides bound to a triazine/BTA molecule via an ester/amide linkage to enable the molecule to be utilized as a plasticizer.

In the particular embodiment illustrated in FIG. 10, the process 1000 further includes utilizing the flame retardant UV light stabilizing molecule as a polymeric additive, at 1004. As an example, the polymeric additive may be used to form an article of manufacture that includes a polymeric material, such as a polycarbonate material. The phosphorus-containing moiety imparts flame retardancy characteristics to the polymeric material, and the HPB moiety imparts UV light stabilization characteristics to the polymeric material.

Thus, FIG. 10 illustrates an example of a process of forming a flame retardant UV light stabilizing molecule and utilizing the molecule as a polymeric additive to impart at least flame retardancy and UV light stabilization characteristics to a polymeric material. The flame retardant UV light stabilizing molecule represents a single additive that may replace multiple separate additives, resulting in advantages associated with process simplification, cost savings, or a combination thereof (among other possible advantages).

Further, as the UV light stabilizing characteristics are associated with an HPB derivative functionality rather than a HALS functionality, the UV light stabilizing additives may be satisfactory to prevent UV degradation in polycarbonate materials.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A flame retardant ultraviolet (UV) light stabilizing molecule that includes a phosphorus-containing flame retardant moiety and a hydroxyphenyl-benzotriazole (HPB) moiety, wherein the phosphorus-containing flame retardant moiety is bound to either a hydroxyphenyl moiety or a benzotriazol moiety of the hydroxyphenyl-benzotriazole (HPB) moiety.

2. The flame retardant UV light stabilizing molecule of claim 1, further comprising a matrix bonding functionality.

3. The flame retardant UV light stabilizing molecule of claim 2, wherein the matrix bonding functionality includes vinyl groups, amine groups, epoxy groups, allyl groups, or acrylate groups.

4. The flame retardant UV light stabilizing molecule of claim 1, further comprising a triazine moiety.

5. The flame retardant UV light stabilizing molecule of claim 4, further comprising a plasticizer bound to the triazine moiety via an aliphatic ester linkage or an aliphatic amide linkage.

6. The flame retardant UV light stabilizing molecule of claim 5, further comprising a second triazine moiety bound to the plasticizer via a second aliphatic ester linkage or a second aliphatic amide linkage.

7. The flame retardant UV light stabilizing molecule of claim 1, further comprising a plasticizer bound to the HPB moiety via an aliphatic amide linkage.

8. The flame retardant UV light stabilizing molecule of claim 7, further comprising a second HPB moiety bound to the plasticizer via a second aliphatic amide linkage.

9. A process comprising:
   forming a flame retardant ultraviolet (UV) light stabilizing molecule that includes a phosphorus-containing flame retardant moiety and a hydroxyphenyl-benzotriazole (HPB) moiety, wherein the phosphorus-containing flame retardant moiety is bound to either a hydroxyphenyl moiety or a benzotriazol moiety of the hydroxyphenyl-benzotriazole (HPB) moiety; and
   utilizing the flame retardant UV light stabilizing molecule as a polymeric additive to impart flame retardant characteristics and UV light stabilization characteristics to a polymeric material.

10. The process of claim 9, wherein the flame retardant UV light stabilizing molecule further comprises a matrix bonding functionality.

11. The process of claim 9, wherein the flame retardant UV light stabilizing molecule further comprises a triazine moiety.

12. The process of claim 11, wherein the flame retardant UV light stabilizing molecule further comprises a plasticizer bound to the triazine moiety via an aliphatic ester linkage.

13. The process of claim 11, wherein the flame retardant UV light stabilizing molecule further comprises a plasticizer bound to the triazine moiety via an aliphatic amide linkage.

14. The process of claim 9, wherein the flame retardant UV light stabilizing molecule further comprises a plasticizer bound to the HPB moiety via an aliphatic amide linkage.

15. An article of manufacture comprising:
a polymeric material; and
a flame retardant ultraviolet (UV) light stabilizing molecule that includes a phosphorus-containing flame retardant moiety and a hydroxyphenyl-benzotriazole (HPB) moiety, wherein the phosphorus-containing flame retardant moiety is bound to either a hydroxyphenyl moiety or a benzotriazol moiety of the hydroxyphenyl-benzotriazole (HPB) moiety.

16. The article of manufacture of claim 15, wherein the polymeric material includes a polycarbonate (PC) material.

17. The article of manufacture of claim 15, wherein the flame retardant UV light stabilizing molecule further includes a matrix bonding functionality.

18. The article of manufacture of claim 17, wherein the matrix bonding functionality including vinyl groups, amine groups, epoxy groups, allyl groups, or acrylate groups.

19. The article of manufacture of claim 15, wherein the flame retardant UV light stabilizing molecule further includes a triazine moiety.

20. The article of manufacture of claim 15, wherein the flame retardant UV light stabilizing molecule further includes an aliphatic ester linkage or an aliphatic amide linkage.

\* \* \* \* \*